United States Patent
Sauvant-Moynot et al.

(10) Patent No.: US 7,049,349 B2
(45) Date of Patent: May 23, 2006

(54) THERMOSETTING COMPOSITION AND ALVEOLAR MATERIAL FORMED FROM SUCH A COMPOSITION

(75) Inventors: Valerie Sauvant-Moynot, Lyons (FR); Jacky Grenier, Vignieu (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 189 days.

(21) Appl. No.: 10/443,127

(22) Filed: May 22, 2003

(65) Prior Publication Data
US 2004/0034112 A1 Feb. 19, 2004

(30) Foreign Application Priority Data
May 23, 2002 (FR) ............................................ 02 06316

(51) Int. Cl.
*C08J 9/00* (2006.01)

(52) U.S. Cl. ........................................ 521/135; 521/178
(58) Field of Classification Search ................ 521/135, 521/178
See application file for complete search history.

(56) References Cited

U.S. PATENT DOCUMENTS

| 4,828,771 A | 5/1989 | Kishima et al. |
| 6,403,669 B1 | 6/2002 | Camberlin et al. |

FOREIGN PATENT DOCUMENTS

| EP | 1000964 | 5/1989 |

*Primary Examiner*—Morton Foelak
(74) *Attorney, Agent, or Firm*—Millen, White, Zelano & Branigan, P.C.

(57) ABSTRACT

A thermosetting composition comprising:

at least one epoxy resin modified by at least one aromatic polyamine, said resin being formed from at least one polyepoxide containing at least two primary amine groups in its molecule, the mole ratio of the polyamine to the epoxide being such that each amine group corresponds to 1.6 to 2.6 epoxy groups; and at least one pore-forming agent or the degradation product or products of said pore-forming agent;

acts to form an alveolar material that can be used in thermal or sound insulation, for example in the building, home or transport fields, and more particularly in the oil exploitation, hydrocarbon transport and refining fields.

19 Claims, No Drawings

THERMOSETTING COMPOSITION AND ALVEOLAR MATERIAL FORMED FROM SUCH A COMPOSITION

BACKGROUND OF THE INVENTION

Field of the Invention

The invention relates to novel formulations for thermosetting compositions for processing alveolar materials, and to the use of said compositions.

The term "thermosetting compositions" as used in the present description means materials with a three-dimensional structure following hardening. In the case of the present invention, said three-dimensional structure is formed by polymerization between an epoxy resin and an aromatic polyamine.

In the present invention, said alveolar materials will be termed foamed materials or cellular materials or expanded materials when the porosity of the final material is formed from cells filled with gas. When hollow bodies of greater or lesser density are used in accordance with the invention in forming the pores of said material, said alveolar materials will be termed "syntactic foams" in the present invention.

In general, the materials of the present invention can be used for thermal or sound insulation, for example in the building, home or transport fields, and more particularly in the field of oil exploitation, hydrocarbon transport and refining.

In the preferred case in which the thermosetting compositions are used in the oil industry, offshore thermal insulation of lines or ducts and pipelines, in particular metal lines or ducts and steel pipelines, is vital when transporting petroleum effluents and natural gas. Keeping the temperature in these lines high prevents the deposition of paraffins and/or hydrate formation. At shallow depths, the lines are generally insulated by cellular foams protected from seawater by an impermeable jacket of a polymer or of steel. At greater depths, when the hydrostatic pressure is high, the lines are usually insulated using syntactic foams. Conventionally, the syntactic foams are placed with their inner face in contact with the line and their outer face in contact with seawater.

Studies carried have shown that the use of a thermosetting composition in the above areas and in particular for insulating offshore lines, requires that the thermosetting composition has the following:

- a matrix glass transition temperature that is higher than that of the effluents, i.e., at least 1000° C.;
- good thermal insulation and low density after thermosetting;
- a relatively long latency period prior to thermosetting, to facilitate handling of the material;
- a relatively low dynamic viscosity prior to thermosetting to facilitate processing of the material; and
- a low water adsorption capacity after thermosetting to preserve the thermal insulation properties at the service temperature and to reduce the risks of hydrolysis.

A thermosetting composition with a high glass transition temperature has been described in European patent application No. 0 833 036, for example. The thermosetting composition described comprises an epoxy resin formed from a polyepoxide containing at least two epoxy groups in its molecule and at least one aromatic polyamine, and also proposes including a flow control agent in said composition to facilitate processing.

SUMMARY OF THE INVENTION

It has now been discovered, and this forms the basis of the present invention, that it is possible to modify the properties of materials such as those described in European patent application No. 0 833 036, for example to adapt them to use as an insulator for offshore lines, by incorporating at least one pore-forming agent or the degradation product or products of said pore-forming agent into the initial composition.

DETAILED DESCRIPTION OF THE INVENTION

Thus, the thermosetting compositions of the invention are defined by the fact that they comprise:

- at least one epoxy resin modified by at least one aromatic polyamine, said resin being formed from at least one polyepoxide containing at least two primary amine groups in its molecule, the mole ratio of the polyamine to the epoxide being such that each amine group corresponds to 1.6 to 2.6 epoxy groups; and
- at least one pore-forming agent or the degradation product or products of said pore-forming agent.

In the present description, the term "pore-forming agent" designates pore-forming agents selected from the group formed by chemical pore-forming agents and physical pore-forming agents resulting in an alveolar material. The pore-forming agents considered in the present invention can also be hollow bodies of greater or lesser density which participate in creating the pores of the final alveolar material, in particular microspheres formed from glass or another material, or cenospheres.

Unexpectedly, the Applicant has discovered that the presence of said pore-forming elements in the matrix does not cause a significant increase in the viscosity of the thermosetting compositions. The dynamic viscosities of the resin compositions in the presence of a hollow body type pore-forming agent prior to thermosetting are of the order of several hundreds to several thousand centipoises (1 cP=1 mPa.s) between 20° C. and 90° C. Said viscosities facilitate processing of said mixtures, in particular pumping, injection and/or molding prior to hardening, in particular when insulating offshore lines.

In general, the mixtures are pumped and poured then placed in a mould using conventional industrial procedures that are well known to the skilled person. Because of the low dynamic viscosity of the mixtures, said procedures can readily be carried out without any risk of damaging the pore-forming agents, in particular when using hollow glass spheres.

Finally, the thermosetting resin compositions of the present invention have an additional advantage when using alveolar materials, as they have long latency periods, which means that the thermosetting composition of the invention can be made in the large volumes required by industrial demand.

The epoxy resin used in the present invention is usually selected from the group formed by the following commercially available resins: bis-phenol A or bis-phenol F diglycidyl ether resin, bisphenol formol resin, phenol-novolac resin, cycloaliphatic resins, tri- or tetrafunctional resins, resins formed from triglycidyl ether-isocyanurate and/or triglycidylether-cyanurate and/or triglycidyl cyanurate and/or triglycidyl-isocyanurate or mixtures of at least two of said resins. The epoxy resins obtained from the epoxy resins cited in U.S. Pat. No. 4,921,047 can also be used in the present invention.

Aromatic polyamines used in the present invention to modify the epoxy resins include a first series of aromatic amines containing a single aromatic ring, for example 3,5-diethyl-2,4-diaminotoluene, 3,5-diethyl-2,6-diaminotoluene and mixtures of these two isomers. Usually, a mixture of said two isomers is used, and is generally designated as DETDA.

A second series of amines used in the present invention includes amines containing at least two aromatic rings, said two aromatic rings generally being linked to each other via a linear or branched, bivalent hydrocarbon residue containing 1 to 18 carbon atoms. Said two aromatic rings are either linked via a bivalent alkyl group or linked to each other via a linear or branched bivalent hydrocarbon residue containing 6 to 18 carbon atoms and containing an aromatic ring.

The aromatic polyamine can also comprise at least one substituent selected from the group formed by fluorine, iodine, bromine and chlorine. It preferably contains at least two alkyl substituents, each being either side of an amino group.

When the two aromatic rings are linked via a bivalent alkylene residue, said residue is preferably a methylidene group that is unsubstituted or substituted with at least one radical selected from alkyl radicals and halogenoalkyl radicals containing 1 to 3 carbon atoms. As an example, said alkylene residue is selected from the group formed by the methylidene group, the isopropylidene group, halogenoisopropylidene groups and the hexafluoroisopropylidene group. In this case, the amine is preferably selected from the group formed by:

4,4'-methylene-bis(2,6-dimethylaniline), M-DMA;
4,4'-methylene-bis(2-isopropyl-6-methylaniline), M-MIPA;
4,4'-methylene-bis(2,6-diethylaniline), M-DEA;
4,4'-methylene-bis(2,6-diisiopropylaniline), M-DIPA; and
4,4'-methylene-bis(3-chloro-2,6-diethylaniline), M-CDEA.

Of said amines, 4,4'-methylene-bis(2,6-diethylaniline and 4,4'-methylene-bis(3-chloro-2,6-diethylaniline) are of particular interest.

When the amine contains two aromatic rings linked to each other via a bivalent substituted or non substituted hydrocarbon residue containing 6 to 18 carbon atoms and comprising an aromatic ring, it is preferably selected from the group formed by:

4,4'-(phenylene-diisopropyl)-bis(2,6-dimethylaniline);
4,4'-(phenylene-diisopropyl)-bis(2,6-diethylaniline);
4,4'-(phenylene-diisopropyl)-bis(2,6-dipropylaniline);
4,4'-(phenylene-diisopropyl)-bis(2,6-diisopropylaniline);
4,4'-(phenylene-diisopropyl)-bis(2,6-dimethyl-3-chloroaniline);
4,4'-(phenylene-diisopropyl)-bis(2,6-diethyl-3-chloroaniline);
4,4'-(phenylene-diisopropyl)-bis(2,6-dipropyl-3-chloroaniline);
4,4'-(phenylene-diisopropyl)-bis(2,6-diisopropyl-3-chloroaniline);
3,3-(phenylene-diisopropyl)-bis(2,6-dimethylaniline);
3,3-(phenylene-diisopropyl)-bis(2,6-diethylaniline);
3,3-(phenylene-diisopropyl)-bis(2,6-dipropylaniline);
3,3-(phenylene-diisopropyl)-bis(2,6-dimethyl-3-chloroaniline);
3,3-(phenylene-diisopropyl)-bis(2,6-diethyl-3-chloroaniline);
3,3-(phenylene-diisopropyl)-bis(2,6-dipropyl-3-chloroaniline);
3,3-(phenylene-diisopropyl)-bis(2,6-diisopropylaniline); and
3,3-(phenylene-diisopropyl)-bis(2,6-diiisopropyl-3-chloroaniline);

Preferred aromatic polyamines are selected for their low reactivity and also for their non toxic nature.

Preferably, thermosetting compositions in accordance with the present invention can comprise a proportion of primary aromatic polyamine of about 20 to about 60 parts by weight per 100 parts of epoxy resin, usually about 25 to about 55 parts per 100 parts of epoxy resin.

The thermosetting compositions of the present invention can also contain catalysts that are active in the reaction between the epoxy resins and the hindered aromatic polyamines. The active catalysts that are most often used are imidazoles, tertiary amines and complexes based on boron trifluoride. It is also possible to add additives usually selected from the group formed by antioxidants, pigments, adhesion promoters, heat stabilizers, radiation stablilizers and more particular ultraviolet radiation stabilizers, flame retardants, mould release agents, foaming nucleation agents, dispersing agents, lubricants, colorants, plasticizers, flame retardants, bridging agents, surfactants, strengthening agents, organic, mineral or organometallic reinforcing agents, mineral or organic reinforcing fibers, such as glass, carbon or boron fibers. The alveolar materials of the present invention can also contain organic fillers or mineral fillers such as talc, silica or titanium dioxide.

Within the context of the present invention, it is also possible to add to the thermosetting composition a highly reactive hardening agent (i.e., with a reactivity that is higher than the principal hardening agent and usually very substantially higher) in small proportions, for example about 1% to 15% by weight, and usually about 1% to 10% by weight with respect to the total composition weight.

Within the context of the present invention, it is also possible to add an agent that can control the viscosity during processing of the foam to the thermosetting composition. The viscosity control agent is selected, for example, from thermoplastic polymers such as polyethersulfones, polyamines, polyimides and polyarylsulfones. The viscosity control agent can also be selected from inorganic thickening fillers, for example silica aerogels.

The proportion of viscosity control agent is preferably about 1% to 10% by weight with respect to the total weight of the thermosetting composition, particularly 1% to 5%.

The invention also pertains to alveolar materials obtained from the thermosetting compositions defined above.

The alveolar materials of the present invention thus contain at least one pore-forming agent as described above and at least one epoxy resin modified by at least one aromatic polyamine, said resin being formed from at least one polyepoxide containing at least two epoxy groups in its molecule and at least one aromatic polyamine, preferably hindered, usually comprising at least two primary amine groups in its molecule, at least one alkyl substituent containing 1 to 12 carbon atoms located alpha to one of the amine groups, the mole ratio of the amine to the epoxide being such that each amine group corresponds to 1.6 to 2.6 epoxy groups.

Said pore-forming agents are compounds that are conventionally employed in forming expanded materials and are well known to the skilled person. Either the pore-forming agent per se is found in the alveolar material produced, for example when it is a gas or a compound which forms a gas on raising the temperature and thus causes the formation of the cells, or the degradation product or products of said pore-forming agent when a compound is used which, when its temperature is raised, will transform and release a gas causing the formation of cells in the polymer composition. Examples of physical pore-forming agents used for preparing the alveolar materials of the present invention that can be cited are liquid or gas compounds such as nitrogen, carbon dioxide, light hydrocarbons, such as methane, ethane, propane, butane, pentane, cyclopentane, hexane or isoheptane, chlorofluorohydrocarbons such as chlorofluorocarbons (CFC) of the freon type, or similar hydrogenated compounds such as hydrochlorofluorocarbons (HCFC). Examples of chemical pore-forming agents that can be used to prepare the alveolar materials of the present invention that can be cited are solid compounds which decompose to form a gas at a temperature peculiar to each pore-forming agent under consideration. Usually, chemical pore-forming agents for which the decomposition temperature is about 150° C. to 250° C., frequently about 180° C. to 250° C., are used. Said chemical pore-forming agents are compounds that are well known to the skilled person. Non-limiting examples that can be cited are organic compounds such as azo compounds, in particular azo-dicarbonamide (1,1'-azobisformamide), N-nitroso compounds, hydrazides, for example p-toluenesulfonyl-hydrazide or oxybis(benzenesulfonyl) hydrazide, para-toluenesulfonyl-semicarbazide, or inorganic compounds such as sodium borohydride, ammonium salts of organic or mineral acids, alkali metal or alkaline-earth metal bicarbonates, mixtures of a plurality of compounds which react together to release a gaseous compound, for example mixtures of carbonates and acids (alkali or alkaline-earth metal bicarbonate with citric acid).

The pore-forming agents considered in the present invention can also be hollow bodies of greater or lesser density which participate in the creation of the pores of the alveolar material, in particular microspheres of glass or another material, or cenospheres.

The amount of pore-forming agents in the expanded material or the amount of degradation products of said pore-forming agent incorporated in the expanded materials is at least sufficient to lower the thermal conductivity of the material and is preferably about 0.1% to 5% by weight and particularly about 0.5% to 2.5% by weight with respect to the total weight of alveolar material. The amount of pore-forming agent in the syntactic foams is normally about 20% to 70% by volume and usually about 50% to 60% by volume with respect to the total volume of alveolar material. The alveolar materials can also be formed from a mixture of pore-forming agents of different natures.

The alveolar materials of the present invention have a glass transition temperature of at least 100° C., but also improved thermal insulation properties because of the addition of said pore-forming agent. Further, the use of said pore-forming agents results in a lower density of the final alveolar material, which has substantial advantages in the hydrocarbon transport field, in particular s regards lightening the structure or the buoyancy of the material at sea.

The present invention will be better understood and its advantages will become clearer from the following examples.

In the examples below, the properties of a composition in accordance with the invention will be described in Example 2 and are compared with those of a reference formulation (Example 1), with the same nature but free of pore-forming agent. Measurements of thermal conductivity, density, glass transition temperature, gel time and dynamic viscosity were carried out on the compositions of Examples 1 and 2 and are shown in Table 1 below.

More precisely, the insulating properties were determined by measuring the thermal conductivity in accordance with American standard C518, using a FOX 50 apparatus. The thermal conductivity was measured at two temperatures (20° C. and 50° C.) on samples polymerized at 150° C. for 4 hours and post-cured at 200° C. for 2 hours.

The density was calculated as the ratio between the mass and the volume of a parallelepipedal sample.

The dynamic viscosity was measured at 90° C. using a PK100® cone-and-plate viscosimeter sold by HAAKE.

The gel time was measured at 120° C. using a TROMBOMAT® apparatus sold by PRODERMAT, which can determine the time to gel, which allows the reactivity of the thermosetting composition being studied to be discussed.

The thermomechanical properties of the samples were determined by DMTA analysis (dynamic mechanical thermal analysis), simple head, at a frequency of 1 Hz. The glass transition temperature (Tg) was measured by convention as the maximum of the dissipation peak E".

These tests were carried out with DGEBA epoxy resin produced and sold by CIBA under the trade name LY 556®. The principal characteristics of the resin are:

dynamic viscosity at 25° C.: 12 Pa.s;

epoxy content: 1.15 equivalents per kilogram; and density: 1.15 g/cm$^3$.

In order to satisfy the stoichiometry of the reaction, it is necessary first to calculate the theoretical quantity of the hardening agent (amine) to be introduced into the mixture per 100 grams of epoxy pre-polymer. This quantity is also known as the "pwcr" (parts by weight percent grams of resin).

$$pwcr = 100 \times \frac{\text{equivalent weight of amine}(*)}{\text{equivalent weight of epoxy}(*)}$$

(*)equivalent weight per reactive hydrogen.

The equivalent weight of epoxy pre-polymer is given by the supplier (CIBA): 5.32 g epoxy equivalent per kg (i.e., 1000:5.32=187.79 g/mole).

The stoichiometry implies the reaction of one molecule of epoxy pre-polymer carrying two epoxy groups with two labile hydrogens of the amine. The primary diamine MCDEA (molecular mass 379.38 g/mol) used in the examples has four mobile hydrogens per molecule. The quantity of amines for the amine used, in pwcr, was 50.5.

EXAMPLES

The examples below illustrate the invention without limiting its scope. Example 1 relates to the prior art and is given by way of comparison. The test compositions were produced as described in Examples 1 and 2 below.

Example 1

50.50 g of M-CDEA was added, with stirring, to 100 g of DGEBA heated to 90° C. Stirring was continued for about 20 minutes following complete dissolution. The temperature was then reduced to 4° C. to preserve the composition.

The properties of this composition are shown in Table 1.

Example 2

In Accordance with the Invention 50.50 g of M-CDEA was added, with stirring, to 100 g of DGEBA heated to 90° C. Stirring (40 rpm) was continued for about 10 minutes following complete dissolution, then the temperature was raised to 110° C. Hollow glass microspheres, density 0.25 g/cm³, were then added to the mixture in an amount of 55% by volume, with stirring and under vacuum.

The results of tests of these compositions are given in Table 1 below. The measured viscosity was the dynamic viscosity at 90° C. expressed in millipascal seconds (mPa.s). The gel time, evaluated at 120° C., is given in hours (h). The glass transition temperature is in degrees Celsius (° C.) and the thermal conductivity is given in watts/meter.Kelvin (W/m.K).

TABLE 1

|  |  | Example 1 | Example 2 |
|---|---|---|---|
| Gel time at 120° C. (h) |  | 8.0 | 6.3 |
| Dynamic viscosity at 90° C. (mPa · s) |  | 800 | 2100 |
| Thermal conductivity | at 20° C. (W/m.K) | 0.209 | 0.119 |
|  | at 50° C. (W/m.K) | 0.222 | 0.124 |
| Density at 20° C. |  | 1.20 | 0.70 |
| Glass transition temperature (° C.) |  | 170 | 171 |

The results of the determinations shown in the table above show that the composition of the present invention (Example 2) has a much lower thermal conductivity than that of the reference compound, Example 1, and thus has an indeniable advantage, in particular as regards thermal insulation. Further, the dynamic viscosity and gel time (latency) properties remain of the same order of magnitude when a pore-forming agent is added, in that the values of said characteristics are in an interval that is suited to processing the alveolar materials from the composition without excessive difficulty, in particular in large volumes.

All references in their entirety referred to herein are hereby incorporated by reference, as well as priority French application 02/06.316 filed May 23, 2002.

It is to be understood that the examples herein are meant to be only illustrative of the invention and not representative of the entire scope of the invention.

Although the invention has been described above in relation to preferred embodiments thereof, it will be readily understood by those skilled in the art that variations and modifications can be affected to those embodiments without departing from the scope and spirit of the invention.

What is claimed is:

1. A thermosetting composition, consisting essentially of
at least one epoxy resin modified by at least one aromatic polyarnine, said resin being formed from at least one polyepoxide containing at least two primary amine groups in its molecule, the mole ratio of the polyamine to the epoxide being such that each amine group corresponds to 1.6 to 2.6 epoxy groups, said epoxy resin constituting at least about 90% by weight of any mixture with a thermoplastic polymer selected from the group consisting of polyethersulfones, polyamines, polyimides and polyarylsulfones; and
at least one pore-forming agent or the degradation product or products of said pore-forming agent incorporated in the composition in at least a sufficient amount to impart a lower thermal conductivity to the composition,
said thermosetting composition prior to being set has a dynamic viscosity, from several hundred to several thousand centipoises, thereby enabling it to be processed by pumping, injection and/or molding.

2. A thermosetting composition according to claim 1, characterized in that said pore-forming agent or said degradation product or products of said pore-forming agent is selected from the group consisting of chemical pore-forming agents and physical pore-forming agents and results in an expanded material.

3. A thermosetting composition according to claim 1, characterized in that the aromatic polyamine used is selected from the group consisting of aromatic amines containing a single aromatic ring and aromatic amines containing at least two aromatic rings, the two aromatic rings being linked to each other via a linear or branched bivalent hydrocarbon residue containing 1 to 18 carbon atoms.

4. A thermosetting composition according to claim 1, characterized in that the aromatic polyamine contains at least one alkyl substituent containing 1 to 12 carbon atoms located alpha to one of the amine groups.

5. A thermosetting composition according to claim 1, further comprising at least one hardening agent in an amount of about 1% to about 15% by weight.

6. A thermosetting composition according o claim 1, further comprising not more than 10% by weight of at least one viscosity control agent.

7. A thermosetting composition according to claim 6 characterized in that said viscosity control agent is selected from the group consisting of thermoplastic polymers and inorganic thickeners.

8. A thermosetting composition according to claim 7, characterized in that said viscosity control agent is selected from the group consisting of polyethersulfones, polyamines, polyamides, polyarylsulfones and silica aerogels.

9. A thermosetting composition according to claim 6, characterized in that the amount of said viscosity control agent is about 1% to about 10% by weight.

10. A method for preparing an alveolar material, comprising thermosetting a thermosetting composition according to claim 1.

11. An alveolar material produced by a method according to claim 10.

12. An alveolar material according to claim 11, wherein said pore-forming agent or said degradation product or products of said pore-forming gent comprises an expanded material.

13. An alveolar material according to claim 12, characterized in that the weight content of said pore-forming agent or said degradation product or products of said pore-forming agent is in the range from about 0.1% to about 5% by weight with respect to the total mass of said expanded material.

14. An alveolar material according to claim 11, comprising a syntactic foam and the pore forming agent comprising hollow glass microspheres.

15. An alveolar material according to claim 14, characterized in that the amount of pore-forming agent is in the range from about 20% to about 70% by volume with respect to the total volume of said syntactic foam.

16. An article of manufacture comprising a metal conduit surrounded, at least in part by an insulating material comprising an alveolar material according to claim 11.

17. An article according to claim 16, further comprising a petroleum product in said conduit.

18. A method of transporting petroleum products under water comprising positioning said article of manufacture according to claim 16, under water and passing petroleum products therethrough.

19. A thermosetting composition according to claim 1, wherein said epoxy resin constitutes at least about 95% by weight of any mixture with a thermoplastic polymer selected from the group consisting of polyethersulfones, polyamines, polyimides and polyarylsulfones.

* * * * *

UNITED STATES PATENT AND TRADEMARK OFFICE
CERTIFICATE OF CORRECTION

| | |
|---|---|
| PATENT NO. | : 7,049,349 B2 |
| APPLICATION NO. | : 10/443127 |
| DATED | : May 23, 2006 |
| INVENTOR(S) | : Sauvant-Moynot et al. |

It is certified that error appears in the above-identified patent and that said Letters Patent is hereby corrected as shown below:

Column 7, line 48 "polyarnine" should read -- polyamine --

Signed and Sealed this

Twelfth Day of December, 2006

JON W. DUDAS
*Director of the United States Patent and Trademark Office*